Figure 1:
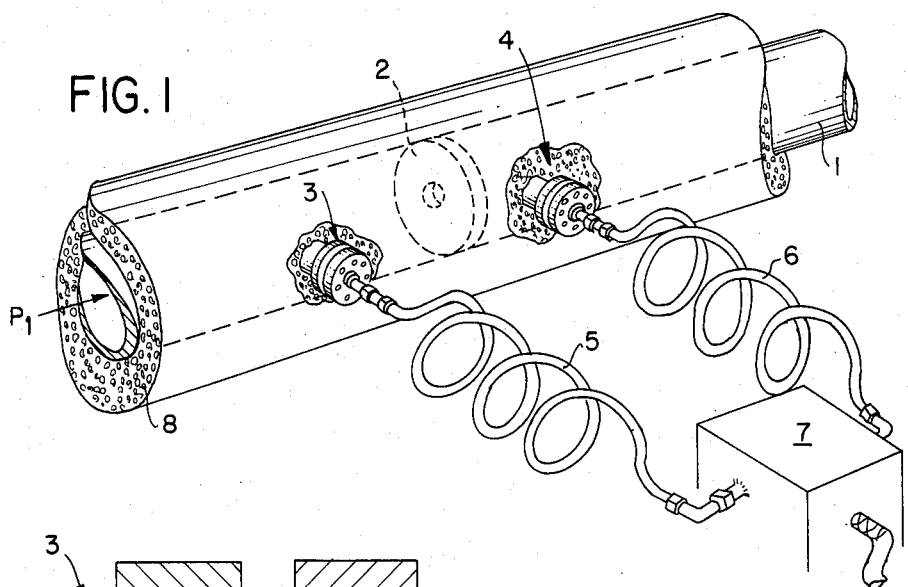

United States Patent [19]

De Boks

[11] Patent Number: 4,611,836
[45] Date of Patent: Sep. 16, 1986

[54] TUBULAR CONNECTING DEVICE

[75] Inventor: Christiaan De Boks, Prinsenbeek, Netherlands

[73] Assignee: M & C Products B.V., Breda, Netherlands

[21] Appl. No.: 642,105

[22] Filed: Aug. 20, 1984

[30] Foreign Application Priority Data

Aug. 23, 1983 [NL] Netherlands .................... 8302948

[51] Int. Cl.$^4$ ............................................. F16L 55/00
[52] U.S. Cl. ...................................... 285/158; 285/169
[58] Field of Search ................................ 285/158, 169

[56] References Cited

U.S. PATENT DOCUMENTS

| Re. 22,713 | 1/1946 | Howe | 285/158 X |
| 1,327,106 | 1/1920 | Leahy | 285/158 X |
| 2,826,436 | 3/1958 | Hupp et al. | 285/158 |
| 3,278,202 | 10/1966 | Smith | 285/368 |
| 3,410,581 | 11/1968 | Christensen | 285/287 X |
| 3,425,452 | 2/1969 | Shaw | 285/287 X |
| 3,516,692 | 6/1970 | Albrecht | 285/158 X |
| 3,865,410 | 2/1975 | Chen | 285/369 |

FOREIGN PATENT DOCUMENTS

| 0058123 | 8/1982 | European Pat. Off. |
| 2439717 | 3/1976 | Fed. Rep. of Germany |
| 1133390 | 4/1955 | France |
| 1168763 | 3/1957 | France |
| 308973 | 12/1952 | Switzerland |
| 478655 | 1/1938 | United Kingdom |
| 2016626 | 3/1979 | United Kingdom |

OTHER PUBLICATIONS

Catalog F "Copper Pipe and Fittings" 1933 Michigan.

Primary Examiner—Thomas F. Callaghan
Attorney, Agent, or Firm—John D. Snyder

[57] ABSTRACT

A process line conveying processed fluid under substantial pressure and having a branched connector is connected to the process duct of a measuring instrument through a pressure duct having first and second coupling sleeves fastened to the branched connector and the process duct, respectively. A first adapter piece is fitted and fixed within an end of the first sleeve and a second adapter piece is fitted and fixed within an end of the second sleeve, the adapter pieces having a diameter equal to the diameter of the pressure duct, and first and second releasable clamping sockets are disposed between the first and second adapter pieces and the respective opposite ends of the pressure duct.

8 Claims, 3 Drawing Figures

U.S. Patent   Sep. 16, 1986   4,611,836

TUBULAR CONNECTING DEVICE

The invention relates to a device for connecting a measuring instrument to a process duct for process-control mainly comprising one or more pressure ducts between measuring instrument and process duct, each pressure duct being connected by coupling means with the process duct and the measuring instrument respectively.

With such a measuring system it is common practice to connect the connecting duct directly with a flange of a flange coupling of the process duct, which gives rise to problems with respect to uniformity, sealing due to temperature fluctuations and mounting. The measuring instrument is located at some distance from the measuring spot so that the connecting duct has to satisfy a predetermined pattern for allowing a connection with the apparatus in the process duct. This requires much skill, particularly because owing to the usually high prevailing pressures great accuracy is required.

The invention has for its object to adapt the device in a manner such that mounting can be appreciably simplified whilst the desired accuracy and the required safety are maintained.

The device embodying the invention is distinguished in that the coupling means comprise a coupling piece to be fastened to the process duct and the measuring instrument respectively and a releasable clamping socket between the coupling piece and the pressure duct.

Thanks to the use of coupling pieces it is no longer necessary to form the pressure duct into shapes that can be bent only with difficulty, since it can be readily adapted to the proportioning of the process system and to the desired angle to the measuring instrument.

In a preferred embodiment the coupling piece is mainly formed by a sleeve having a diameter exceeding that of the connecting duct. On the one hand this ensures centering of the coupling piece between standard coupling flanges and on the other hand, by carefully choosing the diameter of the coupling piece it can become suitable for connection with screw or flange joints up to the 2500 pound class, whilst in addition the clamping coupling can be simply mounted.

Preferably the sleeve is provided with an adapting stub, whose outer diameter and hardness are equal to those of the pressure duct. This ensures a satisfactory seal at the transition from the process duct to the pressure duct.

In order to reduce manufacturing costs, whilst maintaining a high safety factor, the adapting stub is fastened in a chamber of the sleeve by a vacuum welding method. Thus on the one hand material is saved (the costs of material are relatively high owing to the high-quality raw material), whilst on the other hand the vacuum soldering method ensures an accurate and high-quality joint between the two parts.

When a sleeve is used, it is possible to provide it with a flange in one embodiment and with a screwthread in a further embodiment.

The invention will be described more fully hereinafter with reference to an embodiment.

The drawing shows in

Figure 2:
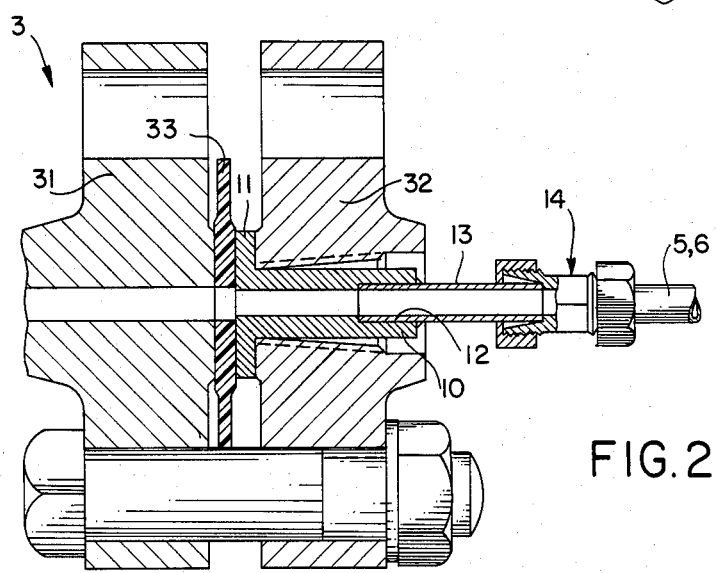
Figure 3:
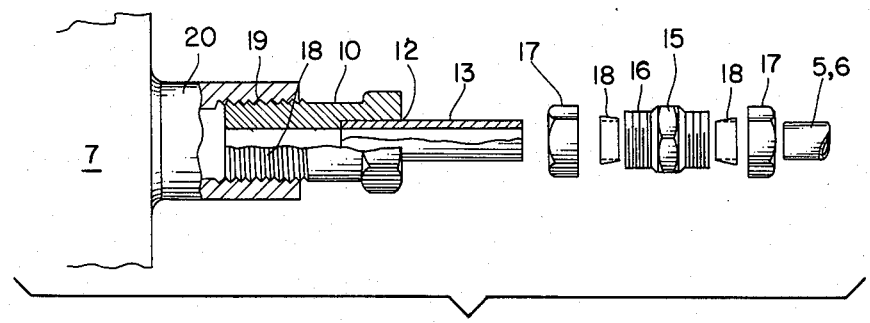

FIG. 1 a schematic, perspective survey of the measuring system embodying the invention, FIG. 2 a longitudinal sectional view of a coupling piece embodying the invention in a first form, FIG. 3 a longitudinal sectional view of a second embodiment of the coupling piece.

Reference numeral 1 in FIG. 1 designates the process duct, through which flows a medium for a process in the direction of the arrow P1. At a predetermined place the duct can be provided with a resistance 2 shown schematically in FIG. 1 in the form of a transverse partition having a small passage. The resistance may be constructed in any suitable manner and lies beyond the scope of the invention.

On both sides of the resistance are arranged connecting flanges 3, 4, with each of which is connected a pressure duct 5 and 6 respectively, which lead to a measuring instrument 7. The process duct may be completely isolated by means of a jacket 8.

It will be obvious that owing to the resistance 2 there will be a pressure difference on the sides of the resistance, which pressure difference is measured by the measuring instrument 7 and may serve for controlling the process. The pressure difference may be dependent on the flow rate P1 but also on other relevant magnitudes in the process.

Since the temperature as well as the overall pressures may be high, for example, up to 400 bars, the connection with the connecting ducts 5, 6 has to be established in a very accurate and safe manner.

The Figures schematically show the design of the connecting ducts 5, 6, but in dependence on the whole process system the pressure duct must have a given configuration corresponding to the desired joint.

In accordance with the invention mounting of the pressure ducts 5, 6 is simplified by using a coupling piece which is described more fully with reference to FIGS. 2 and 3.

FIG. 2 shows a coupling piece formed by a sleeve 10 having a flange 11 formed on one side. The sleeve and the flange may be turned from a single piece of high-quality material. The flange is clamped tight between the two flange plates 31, 32 of a standardized flange joint 3. Between the flange 11 and the flange plate 31 there is arranged a stuffing plate 33 resistant to high temperature and pressure so that some closure is ensured and the isolation 8 can be mounted without any problem. The outer diameter of the sleeve 10 is chosen so that the sleeve centers with respect to the flange plates 31, 32. The gasket 33 has an outer circumference such that it is centered between the clamping bolts to be provided in the holes of the plates 31, 32.

On the other side the sleeve 10 has a chamber 12, in which an adapting piece 13 is fastened, preferably by means of a vacuum soldering method. This vacuum soldering method ensures a very accurate joint owing to the lack of oxygen, which affects the components during soldering.

The adapting piece 13 has an outer diameter preferably corresponding to the tubular ducts 5, 6 so that a clamping socket 14 can establish the connection between the adapting piece 13 and the ducts 5, 6. The clamping socket 14 is of a conventional kind and lies beyond the scope of the invention. It consists (see FIG. 3) of a socket 15 having external screwthread 16 for receiving nut bodies 17. The nut bodies clamp a conical ring 18 between the sleeve 15 and the outer circumference of the ducts 5, 6 and the adapting piece 13 respectively so that a high-quality clamping joint can be obtained.

FIG. 3 shows an alternative embodiment in which the sleeve 10 has a screwthread 18 rather than a flange for co-operating with a screwthread 19 in a stub 20. The screwthreaded sleeve of the measuring instrument 7 may also be screwed into the standardized screwthread of the flange plate 32 when low pressures and temperatures are used in the process. Sealing is then obtained by means of the conventional stuffing tape, which, however, is less reliable than the gasket 33.

The invention is not limited to the embodiments described above. Within the scope of the invention the sleeve 10 and the adapter 13 may be integral with one another so that the soldering joint between these two parts is dispensed with. However, in view of the usual lengths of the coupling piece (about 75 cms) it is preferred to use two parts. The clamping socket may have an angular structure, which involves that the ducts to be connected are at an angle to one another, which simplifies mounting.

What is claimed is:

1. A device for connecting a measuring instrument with a process duct for process control, comprising at least one pressure duct between the measuring instrument and the process duct, and coupling means connecting the pressure duct with the process duct and the measuring instrument respectively; said coupling means comprising first and second coupling sleeves adapted to be fastened to the process duct and the measuring instrument respectively and each having a diameter greater than the diameter of said pressure duct, a first adapter piece fitted and fixed within an end of the first sleeve and a second adapter piece fitted and fixed within an end of the second sleeve, said adapter pieces having a diameter equal to the diameter of said pressure duct, and first and second releasable clamping sockets disposed between the first and second adapter pieces and respective opposite ends of the pressure duct.

2. A device as defined in claim 1 wherein said adapter pieces are fixed to the sleeves by vacuum soldering.

3. A device as defined in claim 2 wherein that end of the first coupling sleeve opposite the associated adapter piece is provided with a flange.

4. A device as defined in claim 2 wherein that end of the second coupling sleeve opposite the associated adapter piece is provided with a screwthread.

5. In a process control system having a process fluid duct conveying process fluid under substantial pressure and a measuring instrument located in spaced relation to the process fluid duct for controlling the process, the combination of at least one branch connector permanently fixed to said process fluid duct and presenting a passage communicating with the process fluid within said process fluid duct, at least one instrument connector permanently fixed to the measuring instrument and having a passage communicating with the measuring instrument, a first sleeve member having a passage communicating with the passage in said branch connector and means connecting one end of said first sleeve memnber to said branch connector, a second sleeve member having a passage communicating with the passage within said instrument connector and means connecting one end of said second sleeve member to the instrument connector, each sleeve member having a counterbore extending into that end of the respective sleeve member opposite the end of thereof which is connected respectively to said branch connector and said instrument connector, a first tubular adapting piece having one end snugly fitted within the counterbore of the first sleeve member and permanently fixed to the first sleeve member within the counterbore thereof with a length of the first tubular adapting piece projecting beyond said first sleeve member, a second tubular adapting piece having one end snugly fitted within the counterbore of the second sleeve member and permanently fixed to the second sleeve member within the counterbore thereof with a length of the second tubular adapting piece projecting beyond the second sleeve member whereby the projecting lengths of the first and second tubular adapting pieces are located in spaced and arbitrarily oriented relation to each other dictated by the spacing and orientation between the process fluid duct and the measuring instrument, a pressure duct of a generally coil-like form having a length substantially greater than the spacing between said lengths of the first and second tubular adapting pieces and having opposite end portions manipulated into said arbitrarily oriented relation and in closely spaced relation to such lengths, and clamping socket means connecting said opposite end portions of the pressure duct to the respective lengths of the first and second adapting pieces.

6. In a process control system as defined in claim 5 wherein said tubular adapting pieces and said pressure duct are of the same outer diameter and said clamping socket means connect the opposite end portions of the pressure duct and the respective lengths of the first and second adapting pieces in axially aligned relation.

7. In a process control system having a process fluid duct conveying process fluid under substantial pressure and a measuring instrument located in spaced relation to the process fluid duct for controlling the process, the combination of at least one branch connector permanently fixed to said process fluid duct and presenting a passage communicating with the process fluid within said process fluid duct, said branch connector terminating in a flange, at least one instrument connector permanently fixed to the measuring instrument having a passage communicating with the measuring instrument, a first sleeve member having a flange portion at one end and a passage communicating with the passage in said branch connector and clamping means including a flange plate for clamping said flange portion between said flange of the branch connector and said flange plate, a second sleeve member having a passage communicating with the passage within said instrument connector and means connecting one end of said second sleeve member to the instrument connector, each sleeve member having a counterbore extending into that end of the respective sleeve member opposite the end thereof which is connected respectively to said branch connector and said instrument connector, a first tubular adapting piece having one end snugly fitted within the counterbore of the first sleeve member and permanently fixed to the first sleeve member within the counterbore thereof with a length of the first tubular adapting piece projecting beyond said first sleeve member, a second tubular adapting piece having one end snugly fitted within the counterbore of the second sleeve member and permanently fixed to the second sleeve member within the counterbore thereof with a length of the second tubular adapting piece projecting beyond the second sleeve member whereby the projecting lengths of the first and second tubular adapting pieces are located in spaced and arbitrarily oriented relation to each other dictated by the spacing and orientation between the process fluid duct and the measuring instrument, a pressure duct of generally coil-like form having a length substantially greater than the spacing between said lengths of the first and second tubular adapting pieces and having opposite end portions manipulated into said arbitrarily oriented relation and in closely spaced relation to such lengths, and clamping socket means connecting said opposite end portions of the pressure duct to the respective lengths of the first and second adapting pieces.

8. In a process control system as defined in claim 7 wherein said tubular adapting pieces and said pressure duct are of the same outer diameter and said clamping socket means connect the opposite end portions of the pressure duct and the respective lengths of the first and second adapting pieces in axially aligned relation.

* * * * *